United States Patent Office 3,390,130
Patented June 25, 1968

3,390,130
PROCESS FOR THE PRODUCTION OF CYCLIC SULPHONYL NITROGENOUS CO-POLYMERS OF FORMALDEHYDE
Ernst-Ulrich Kocher, Leverkusen, Otto Bayer, Burscheid, and Kuno Wagner and Wolfgang von der Emden, Leverkusen, Germany, assignors to Farbenfabriken Bayer Aktiengesellschaft, Leverkusen, Germany, a German corporation
No Drawing. Filed May 3, 1965, Ser. No. 452,860
Claims priority, application Germany, July 2, 1964, F 43,327
14 Claims. (Cl. 260—67.5)

ABSTRACT OF THE DISCLOSURE

Copolymers based on trioxane and N-sulphonyl aziridines having improved thermostability.

---

This invention relates to new thermostable copolymers of formaldehyde and to a process for the production of these co-polymers, according to which cyclic oligomers of formaldehyde, for example trioxane, are polymerised in the presence of cyclic, organic nitrogen-containing compounds.

Many methods are known for converting formaldehyde into linear polymers of different chain length. However, these polyoxymethylenes are easily and quantitatively split by thermal treatment into monomeric formaldehyde.

Furthermore, trioxane, the cyclic trimer of formaldehyde, can be polymerised in the presence of cationically active catalysts and more especially Lewis acids to form linear polyoxymethylenes, but these polymers are unstable under the action of heat. A considerable improvement in the thermostability of polyoxymethylene can be produced by modifying their terminal groups, as proven in about 1930 by H. Staudinger, by introducing terminal acetyl groups or methoxy groups. The introduction of terminal alkyl groups yields products which, as well as improved thermostability, also have an excellent resistance to alkali, on account of their pure polyacetyl structure.

Such modified polyoxymethylenes still have too low a thermostability for technical requirements, since acids and oxygen cause a splitting of the polyoxymethylene chains in the interior thereof, and this in turn results in a total degradation of the affected molecules. Two methods have already been suggested for counteracting this disadvantage. In one case, the influences of oxygen and acids can be counteracted by introducing additional stabilisers, which assist in preventing degradation. In the other case, copolymers are produced from trioxane and cyclic ethers, acetals and lactones, which copolymers contain not only (—CH$_2$O—) elements, but also to a slight extent (—CH$_2$—CH$_2$—O—) elements. Once a chain degradation has started, it comes to a stop at such an oxyethylene group. Such products are similar in their chemical behaviour, to those which are obtained by subsequent terminal group alkylation of polyoxymethylenes, that is to say, their susceptibility to the action of acids and to oxidation influences remains high and does not change.

The use of additional stabilisers is consequently also necessary with such copolymers.

A further advance in the improvement in the thermostability of polyoxymethylenes can be obtained by using cyclic comonomers which contain sulphur, but the polymerisation velocity of the monomer mixture is reduced, so that the quantity of these comonomers which can be used is limited in practice.

A process for the production of co-polymers of formaldehyde having improved thermostability has now been found, in which trioxane is polymerised together with cyclic organic nitrogen-containing compounds of the general formula

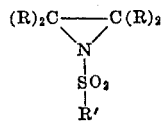

in the presence of cationically active catalysts.

In this general formula, R represents hydrogen or a lower alkyl radical having perferably 1 to 6 carbon atoms, and R' represents an alkyl radical having preferably 1 to 6 carbon atoms and an aryl radical, e.g. a phenyl, naphthyl, anthracenyl, diphenyl radical, aralkyl radical, e.g. a benzyl radical or alkaryl radical, e.g. one of the tolyl radicals, the total number of carbon atoms in these radicals amounting from 6 to 20.

The co-monomers are N-sulphonyl aziridines, and examples thereof are N-methane-sulphonyl ethylene imine, N-methane-sulphonyl propylene-1,2-imine, N-benzenesulphonyl ethylene imine, N-toluene-sulphonyl ethylene imine, and N-methane-sulphonyl butylene-1,2-imine.

These N-sulphonyl aziridines can be prepared by known processes, for example by reacting a sulphochloride with an ethylene imine, optionally substituted on the carbon atom by an alkyl radical in an inert solvent and in the presence of tertiary organic bases.

If the co-polymer is to have the properties of a polyoxymethylene these comonomers advantageously are used in an amount of from about 0.5 to 5 mol percent, based on the trioxane introduced. Larger quantities of the co-monomer (up to 50 mol percent) can be used, if one wishes to modify the properties for example to change the melting point, change the mechanical properties and also to improve the solubility in organic solvents.

It is surprising that the new co-monomers do not influence the polymerization velocity of the trioxane and consequently also do not necessitate the use of increased catalyst quantities, so that molar weights of more than 30,000 easily can be obtained with co-monomer quantities of 10% by weight and higher, based on the trioxane.

In addition to strong acids, such as sulphuric acid, perchloric acid or alkane-sulphonic acids and p-toluosulphonic acid, other cationically active catalysts which are particularly to be considered are those compounds which are designated as Lewis acids. Examples are boron trifluoride, boron trichloride, aluminium trichloride, ferric chloride, antimony pentachloride, titanium tetrachloride and tin tetrachloride, as well as the fluorides of the abovementioned metals; or the addition compounds of boron trihalides (more especially of boron trifluoride), with ethers (for example, with di-n-butyl ether or tetrahydrofuran), with phenols (e.g. with phenol or anisol), with carboxylic acid esters (e.g. with ethyl acetate), with carboxylic acid anhydrides (e.g. with acetanhydride), with amines (e.g. with diphenylamine) and with monocarboxylic or dicarboxylic amides (e.g. with acetamide); or halogen-containing organic metal compounds of aluminium and tin (for example, ethyl-aluminium dichloride, diethyl-aluminium monochloride and diethyl-tin-dichloride) as well as oxonium salts and carboxonium salts (such as triethyl-oxonium fluoborate and 2-methyl-dioxolenium fluoborate). Fluoborates of aryldiazonium compounds, which are converted into aryl cations at high temperature with nitrogen being split off are also suitable. The catalysts are added to the polymerisation medium in quantities of 0.001 to 1% by weight, based on the weight of the formaldehyde introduced.

The copolymerization can be carried out as block polymerisation, which takes place within a short time and with almost quantitative yields. For this purpose, the catalyst is melted together with the trioxane and simultaneously the comonomer is added, or advantageously the trioxane is melted with the comonomer and then the catalyst is introduced, possibly dissolved in an inert solvent. However, the polymerisation can also be carried out in suspension in an organic liquid, in which trioxane has only limited solubility. Suitable for such a procedure are for example straight-chain aliphatic hydrocarbons containing more than 8 carbon atoms or mixtures thereof, for example a $C_{12}$–$C_{18}$ fraction of boiling point within the range 230 to 320° C.

If the polymerisation takes place as solution polymerisation, the following solvents can be used: benzene, toluene, hexane, heptane, cyclohexane, isooctane, white spirit, hydrogenated trimeric isobutylene and chlorinated hydrocarbons.

The polymerisation according to the invention generally is effected at temperatures of from 50 to 120° C., advantageously at 70 to 110° C. It is often possible with advantage to work at about 70 to 85° C. It is also possible to work at temperatures above or below the indicated range in special cases.

During the heating, the copolymers suffer a certain degradation before they reach their maximum stability. This degradation reaction can be accelerated by heating the crude polymer in inert solvents or in alcohols, which form semiacetals with the degraded formaldehyde. Organic or inorganic bases which simultaneously destroy the polymerisation catalyst preferably are added to promote this reaction.

It is possible to produce copolymers of various molecular weight range depending on their intended purpose of use. For use as thermoplastic material in the manufacture of moulded elements by injection moulding or for the production of fibres by melt spinning or dry spinning processes, it is co-polymers of high melocular weight which are suitable, the reduced viscosity thereof being in the range of about 0.6 to 3.0, measured at 60° C. in a 0.5% solution of p-chlorophenol. For the production of such copolymers, the quantity of the organic nitrogen compound introduced advantageously is 0.5 to 5 mol percent, based on the trioxane introduced (calculated as $CH_2O$). Light stabilisers, dyestuffs, pigments, and optionally heat and oxidation stabilizers, fillers or plasticisers can for example be added to these polymers.

If the co-polymers are to be used as intermediate products or auxiliaries in the plastics field, lower molecular weights down to about 500 may be desirable. For this purpose, higher proportions of nitrogenous comonomers, up to about 50 mol percent based on monomeric formaldehyde, are used. In this case, the copolymers obtained can have a resin-like consistency at room temperature. The crystallinity of the copolymers increases with increasing proportion of formaldehyde and the melting point rises.

Furthermore, it is possible by using other co-monomers in addition, for example cationically polymerisable olefines or cyclic organic oxygen or organic sulphur compounds, still further to modify the properties of the co-polymers. To be mentioned as examples of these co-monomers are styrene, acryonitrile, ethyl vinyl ether, methyl vinyl sulphone or epoxy compounds (such as ethylene oxide or propylene oxide), cyclic acetals (such as 1,3-dioxolane or diethylene glycol formal), as well as analogous thio compounds (such as ethylene sulphide, propylene sulphide, 1,3 - oxthiolane or thiodiglycol formal).

The copolymers prepared in accordance with the invention reach their excellent thermostability after only a short thermal or chemical treatment, during which relatively small unstable fractions are degraded. This can occur by heating in substance, in suspension (e.g. in high-boiling hydrocarbons) or in solution, for example in dimethyl formamide, butyrolactone or dimethyl sulphoxide, at temperatures in the range of from 120° to more than 200° C. The degradation of unstable fractions can however also be effected by the action of aqueous sodium hydroxide solution of alcohols containing up to 6 carbon atoms, e.g. cyclohexanol, in the presence of basic compounds. Suitable as basic compounds are alkali hydroxides and organic bases such as pyridine, tri-n-butyl-amine, alkanolamines, etc. The degradation to the terminal comonomer units can also be affected by granulation in an extruder, optionally with the addition of organic bases.

Example 1

300 g. of trioxane are heated to 70° C. with 300 ml. of a saturated hydrocarbon mixture (B.P. 230 to 320° C.) while stirring, and 8.0 g. of N-methanesulphonyl ethylene imine and then 0.1 ml. of boron fluoride dibutyl etherate are added. After 1 minute, the polymerisation starts in recognisable manner; after 3½ hours, the experiment is stopped, the polymer is suction filtered off and washed with methylene chloride. The yield is 223 g. The product has an inherent viscosity of 0.869, measured at 60° C. in 0.5% p-chlorophenol solution. After an alkali treatment, the thermal degradation is 1.2% per hour at 222° C.

The sulphur content of the product is determined analytically to be 0.70%.

Example 2

With the same working method as in Example 1, 12.2 g. of N-benzenesulphonyl ethylene imine are used as co-monomer instead of N-methanesulphonyl ethylene imine. The experiment is stopped after 130 minutes. The yield is 253 g.; the inherent viscosity, measured as in Example 1, is 0.992. The thermal degradation after alkali treatment is 2.4% per hour. The sulphur content is established analytically to be 0.65%.

We claim:

1. Copolymers of trioxane and 0.5 to 50 mol percent based upon trioxane of a cyclic nitrogen compound of the formula

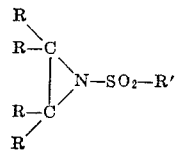

wherein R represents a member of the group consisting of hydrogen and a lower alkyl radical and R' represents a member of the group consisting of an alkyl radical, aryl radical, aralkyl radical and an alkaryl radical.

2. Copolymers of trioxane and 0.5 to 50 mol percent based upon trioxane of a cyclic nitrogen compound of the formula

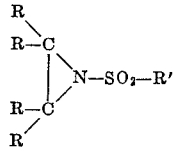

wherein R represents a member of the grounp consisting of hydrogen and an alkyl having 1 to 6 carbon atoms, R' represents a member of the group consisting of an alkyl radical having 1 to 6 carbon atoms, a phenyl radical, a naphthyl radical, an anthracenyl radical, a diphenyl radical, a benzyl radical and a tolyl radical.

3. Copolymers of trioxane and 0.5 to 50 mol percent based upon trioxane of N-methane-sulphonyl ethylene amine.

4. Copolymers of trioxane and 0.5 to 50 mol percent based upon trioxane of N-benzene-sulphonyl ethylene imine.

5. Process for producing trioxane copolymers which comprises copolymerizing trioxane and 0.5 to 50 mol percent based upon trioxane of a cyclic nitrogen compound of the general formula

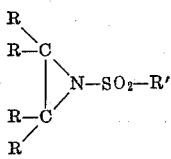

wherein R represents a member of the group consisting of hydrogen and a lower alkyl radical and R' represents a member of the group consisting of an alkyl radical, aryl radical, aralkyl radical and an alkaryl radical, at temperatures between 50 and 120° C. in the presence of cationically acting catalysts.

6. Process for producing trioxane copolymers which comprises copolymerizing trioxane and 0.5 to 50 mol percent based upon trioxane of a cyclic nitrogen compound of the general formula

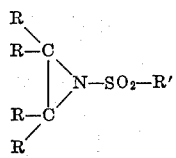

wherein R represents a member of the group consisting of hydrogen and an alkyl having 1 to 6 carbon atoms, R' represents a member of the group consisting of an alkyl radical having 1 to 6 carbon atoms, a phenyl radical, a naphthyl radical, an anthracenyl radical, a diphenyl radical, a benzyl radical and a tolyl radical, at temperatures between 50 and 120° C. in the presence of cationically acting catalysts.

7. Process according to claim 5, wherein the copolymerization is carried out in suspension in an organic solvent.

8. Process according to claim 5, whereby the copolymerization is carried out as block polymerization in the melt.

9. Process according to claim 5, wherein the copolymerization is carried out as solution polymerization in an organic solvent.

10. Process according to claim 5, wherein said cationically acting catalyst is selected from the group consisting of a strong mineral acid, a sulphonic acid, a Lewis acid, a boron halide etherate, an oxonium, carboxonium and a diazonium fluoborate.

11. A copolymer of trioxane and from 0.5 to 50 mol percent based upon trioxane of a cyclic nitrogen compound having the formula

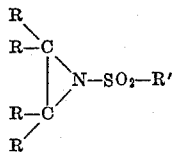

wherein R stands for hydrogen or lower alkyl having up to 6 carbon atoms and R' stands for lower alkyl having up to 6 carbon atoms or an aryl radical selected from the group consisting of phenyl, naphthyl, anthracenyl, diphenyl, benzyl and tolyl, the total number of carbon atoms in said aryl radical being from 6 to 20 carbon atoms.

12. A copolymer according to claim 11 wherein R' stands for methyl, phenyl or tolyl.

13. Copolymers of trioxane produced by copolymerizing trioxane and 0.5 to 50 mol percent based on trioxane of a cyclic nitrogen compound of the formula:

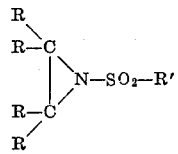

wherein R is hydrogen or lower alkyl and R' is alkyl, aryl, aralkyl or alkaryl and, as an additional comonomer, a member selected from the group consisting of styrene, acrylonitrile, ethyl vinyl ether, methyl vinyl sulphone, ethylene oxide, propylene oxide, 1,3-dioxolane, diethylene glycol formal, ethylene sulphide, propylene sulphide, 1,3-oxthiolane and thiodiglycol formal at a temperature between 50 and 120° C. in the presence of a cationically acting catalyst.

14. The process of claim 5 wherein, as an additional comonomer, a member selected from the group consisting of styrene, acrylonitrile, ethyl vinyl ether, methyl vinyl sulphone, ethylene oxide, propylene oxide, 1,3-dioxolane, diethylene glycol formal, ethylene sulphide, propylene sulphide, 1,3-oxthiolane and thiodiglycol formal is employed.

No references cited.

WILLIAM H. SHORT, *Primary Examiner.*

E. M. WOODBERRY, *Assistant Examiner.*